United States Patent [19]
Nicholls

[11] Patent Number: 5,242,184
[45] Date of Patent: Sep. 7, 1993

[54] SEAT MOUNTED BICYCLE PORTAGE ACCESSORY

[76] Inventor: William J. Nicholls, 1149 S. Douglas St., Salt Lake City, Utah 84105

[21] Appl. No.: 759,507

[22] Filed: Sep. 13, 1991

[51] Int. Cl.⁵ ............................................. B62J 1/00
[52] U.S. Cl. .................. 280/304.5; 280/220; 280/283; 280/287; 297/195.1
[58] Field of Search ............... 280/281.1, 288.4, 304.5, 280/220, 283, 287; 297/195

[56] References Cited

U.S. PATENT DOCUMENTS

| | | | |
|---|---|---|---|
| 575,184 | 1/1897 | Voelker | 297/195 X |
| 2,550,200 | 4/1951 | Murrell | 297/195 X |
| 4,093,263 | 6/1978 | Rihm | 297/195 X |
| 4,451,083 | 5/1984 | Marchello | 297/195 |
| 4,786,104 | 11/1988 | Fellenbaum | 297/195 X |

FOREIGN PATENT DOCUMENTS

| | | | |
|---|---|---|---|
| 449572 | 9/1927 | Fed. Rep. of Germany | 280/304.5 |
| 1023487 | 3/1953 | France | 280/304.5 |

*Primary Examiner*—Joseph D. Pape
*Attorney, Agent, or Firm*—Thorpe, North & Western

[57] ABSTRACT

A bicycle carrying accessory for use in connection with a conventional bicycle having a frame, a seat post extending upwardly from the frame, and a seat mounted on top of the post. The accessory includes an arcuate cushion having a forward end and a lower end, a fastening mechanism for detachably affixing the lower end of the cushion to the front side of the seat post, and another fastening mechanism for attaching the forward end of the cushion to the underside of the front section of the bicycle seat. From such front section of the seat, the cushion thus curves rearwardly and downwardly to a location in front of and adjacent to the seat post. In this position, the bicycle may be readily lifted to position the pad over the shoulder to allow for carrying the bicycle.

19 Claims, 5 Drawing Sheets

SEAT MOUNTED BICYCLE PORTAGE ACCESSORY

BACKGROUND OF THE INVENTION

This invention relates to a bicycle carrying accessory attachable to the underside of a bicycle seat to enable comfortably resting the accessory on a shoulder, arm or the like for facilitating carrying of a bicycle.

Although the manual lifting and carrying of bicycles has been required under certain circumstances for many years, with the more recent advent and popularity of mountain bicycles and triathalon bicycles, the need for even more frequent lifting and portage of bicycles has arisen. This, of course, is due in part to the rough terrain over which mountain bicycles and triathalon bicycles are frequently ridden, oftentimes requiring a rider to dismount from the bicycle and carry it over or around obstacles where riding the bicycle would be extremely difficult if not impossible. Even when bicycles are used in less rigorous circumstances such as by commuters or apartment dwellers simply to ride over relatively smooth riding paths, there is oftentimes a need for carrying the bicycles up several flights of stairs to keep them in safe places, free from theft or vandalism.

A commonly used approach for assisting and making more comfortable the carrying of bicycles involves employment of a pad which is attached to the underside of a top bicycle crossbar and to the forward side of the primary vertical bar so that the bicycle may be lifted or otherwise positioned to enable inserting an arm through the opening circumscribed by the crossbar, vertical bar and angled bar, and placing the pad onto the person's shoulder. In this position, the bicycle is balanced to maintain the pad on the shoulder so that the bicycle can be carried. One problem with this approach is that oftentimes there is not enough room in the space between the frame bars to allow inserting an arm and a shoulder to allow positioning the pad on the shoulder. The reason for this is that many bicycles include water bottle mounts and/or tire pump mounts in the space so that insufficient room is left to comfortably fit the arm and shoulder for carrying the bicycle. Another problem with the conventional approach is that even if the bicycle can be hoisted to the shoulder, the location of the pad and positioning of the bicycle make it difficult to balance the bicycle while it is being carried.

SUMMARY OF THE INVENTION

It is an object of the invention to provide a seat mounted portage accessory which facilitates the convenient and comfortable carrying of bicycles.

It is another object of the invention to provide such an accessory which avoids the typical space limitation problems of prior art carrying pads.

It is a further object of the invention to provide such an accessory which is mountable on a bicycle at a location to provide for more convenient and simple hoisting of the bicycle into carrying position, and a more balanced carrying of the bicycle.

It is still another object of the invention to provide such an accessory which may be quickly mounted to and removed from a conventional bicycle saddle or seat.

The above and other objects are realized in a specific illustrative embodiment of a carrying accessory for bicycles which have a frame, a seat post extending upwardly from the frame, and a seat mounted on top of the post. The accessory includes an arcuate, flexible pad having a lower end and a forward end, for attaching to the bicycle so that the pad, with the lower end adjacent to the post, extends upwardly and forwardly to a location where the forward end is adjacent and under the front end of the seat. Also included is an implement for attaching the lower end of the pad to the front side of the post, and an insert which allows for the attaching the forward end of the pad to the underside of the front end of the seat.

Alternatively, the carrying accessory may be formed to be integral with a bicycle seat or saddle to extend downwardly and rearwardly from a forward section of the saddle to a location in front of and adjacent to the seat post. There, the accessory may be attached to the post, if desired, to more securely hold it in place. Of course, the carrying pad may also be mounted or formed underneath and rearwardly of the seat, if the seat lends itself to such disposition.

BRIEF DESCRIPTION OF THE DRAWINGS

The above and other objects, features and advantages will become apparent from a consideration of the following detailed description presented in connection with the accompanying drawings in which.

DETAILED DESCRIPTION

Figure 1:
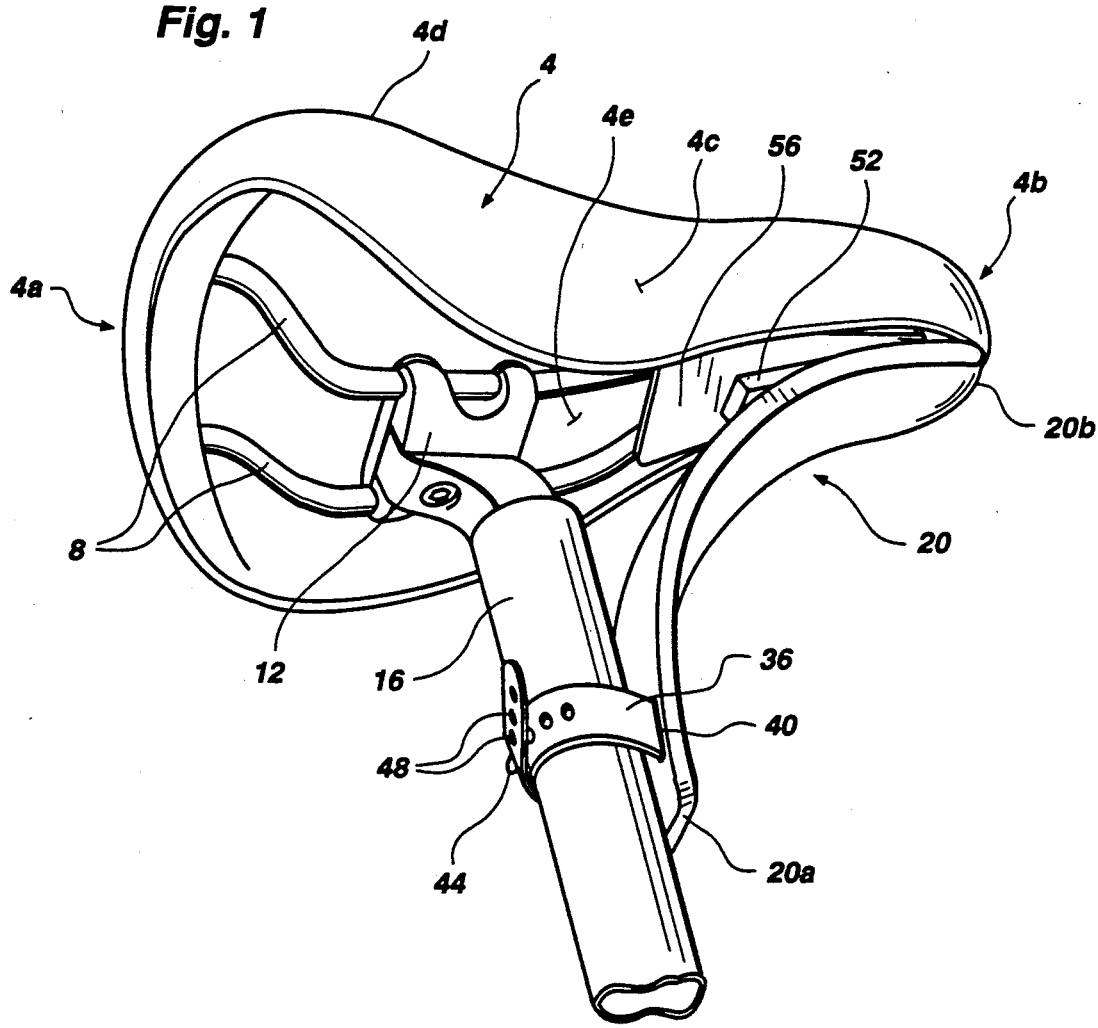
FIG. 1 is a side, bottom perspective view of a seat-mounted bicycle carrying accessory made in accordance with the principles of the present invention.
Figure 2:
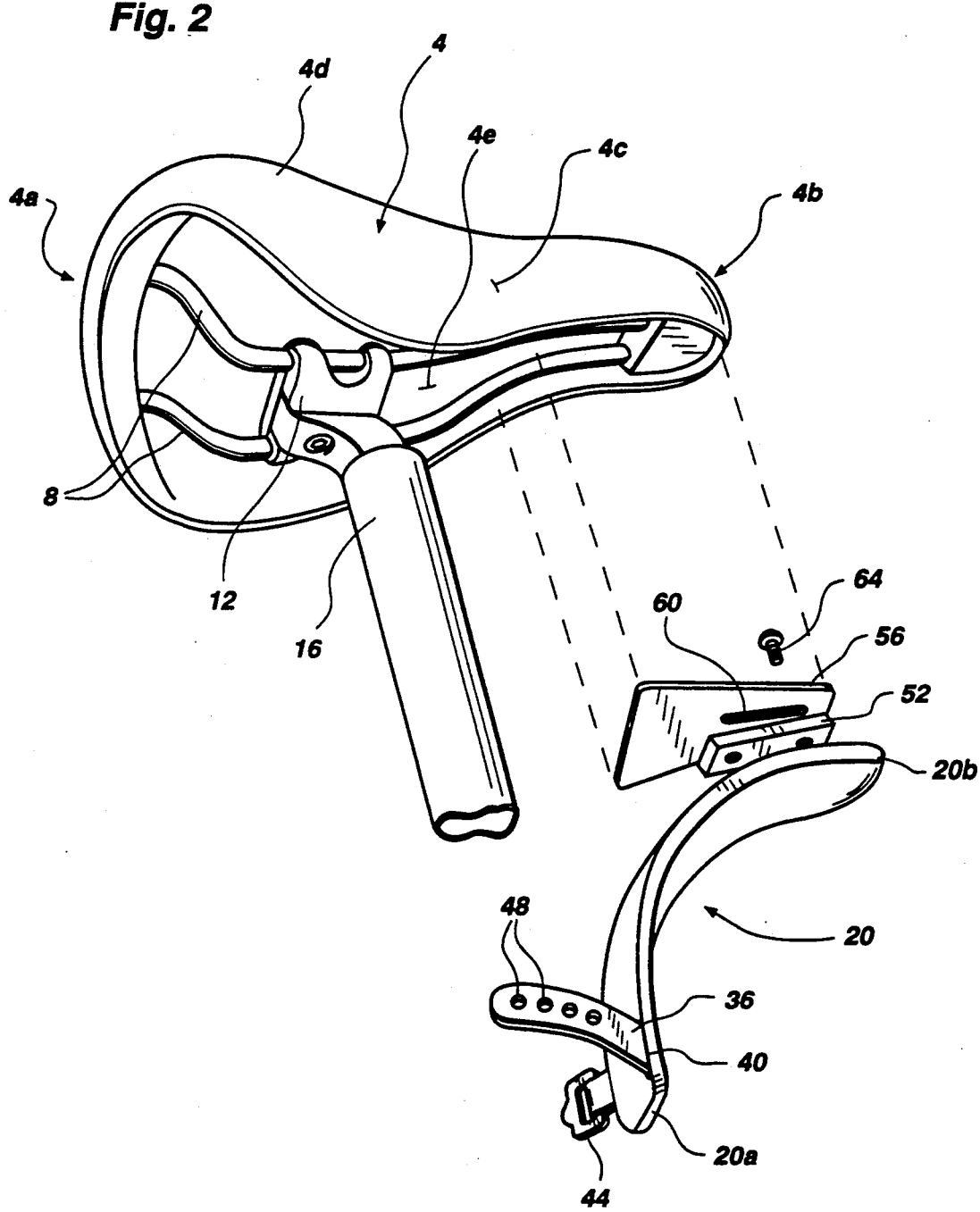
FIG. 2 is a side, bottom, exploded view of the bicycle carrying accessory of FIG. 1.
Figure 3:
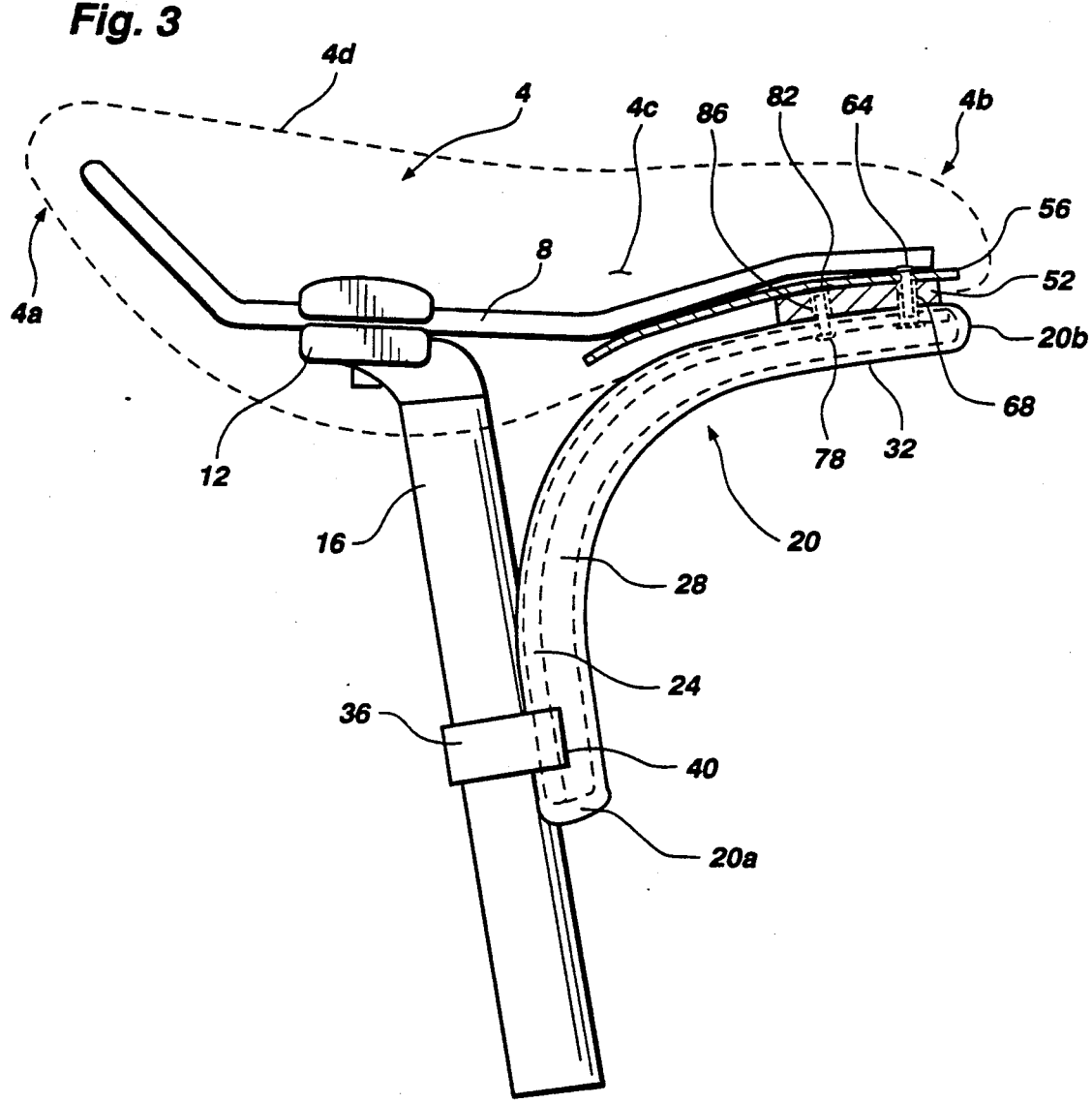
FIG. 3 is a side, elevational view of such a bicycle carrying accessory shown mounted to a conventional bicycle seat and post.

Referring to FIGS. 1–3, there is shown a conventional bicycle seat or saddle 4 mounted on saddle support rails 8 which, in turn, are secured in a bicycle seat post clamp 12. The seat post clamp 12 is mounted on top of a conventional seat post 16. All these components are of conventional design and construction. The seat post 16 is mountable in a conventional bicycle frame in a well-known manner.

The saddle 4 includes a wider rear section 4a (FIGS. 1 and 2) which tapers transversely inwardly to a narrower front section 4b. The saddle 4 is formed with sides 4c which extend downwardly from an upper surface 4d to define a wedge-shaped hollow portion 4e underneath the saddle.

Figure 4:
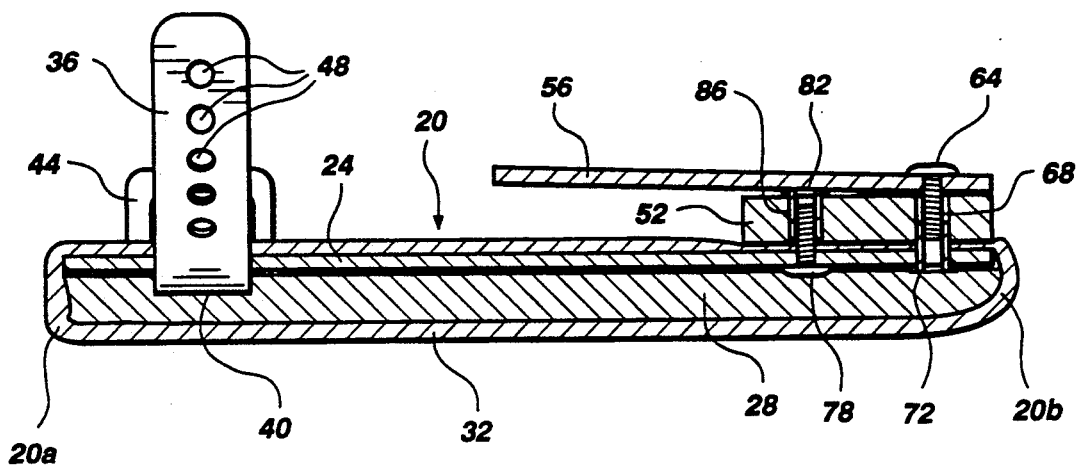
FIG. 4 is a side, elevational view of a bicycle carrying accessory made in accordance with the present invention and shown unmounted.

The bicycle carrying accessory of the present invention includes an elongate arcuate pad or cushion 20 having a lower end 20a and a forward end 20b. The pad, in turn, includes a flexible and resilient stiffener strip 24. The stiffener strip 24 might illustratively be made of plastic such as high density polyethylene. Of course, other materials with the desired properties could also be utilized. Disposed over the front side of the stiffener strip 24 is resilient padding 28. The padding 28 might illustratively be made of closed-cell neoprene foam or other soft and spongy material. Finally, a cover 32 is disposed about the stiffener strip 24 and padding 28 as best seen in FIGS. 3 and 4. The cover 32 completely surrounds and encloses the stiffener strip 24 and the padding 28 to hold the padding in place on a front side of the stiffener strip 24. The cover might illustratively be made of lycra to provide a durable and attractive protective cover.

The lower end 20a of the pad 20 is attachable to the seat post 16 by way of a flexible strap 36. The strap 36 is insertable through openings 40, formed on opposite sides of the cover 32, to a position between the stiffener strip 24 and the padding 28 as best seen in FIGS. 3 and 4. A conventional buckle 44 is attached to one end of the strap 36 and holes 48 are formed in a row at the other end of the strap to allow buckling the ends together around the seat post 16 to secure the lower end 20a of the pad 20 against the front side of the seat post as best seen in FIGS. 1 and 3. Advantageously, the strap 36 is made of a non-skid material, such as urethane rubber, so that when it is wrapped and buckled about the seat post 16, it will tend to prevent twisting or other movement of the lower end 20a of the pad 20 on the seat post.

Figure 5:
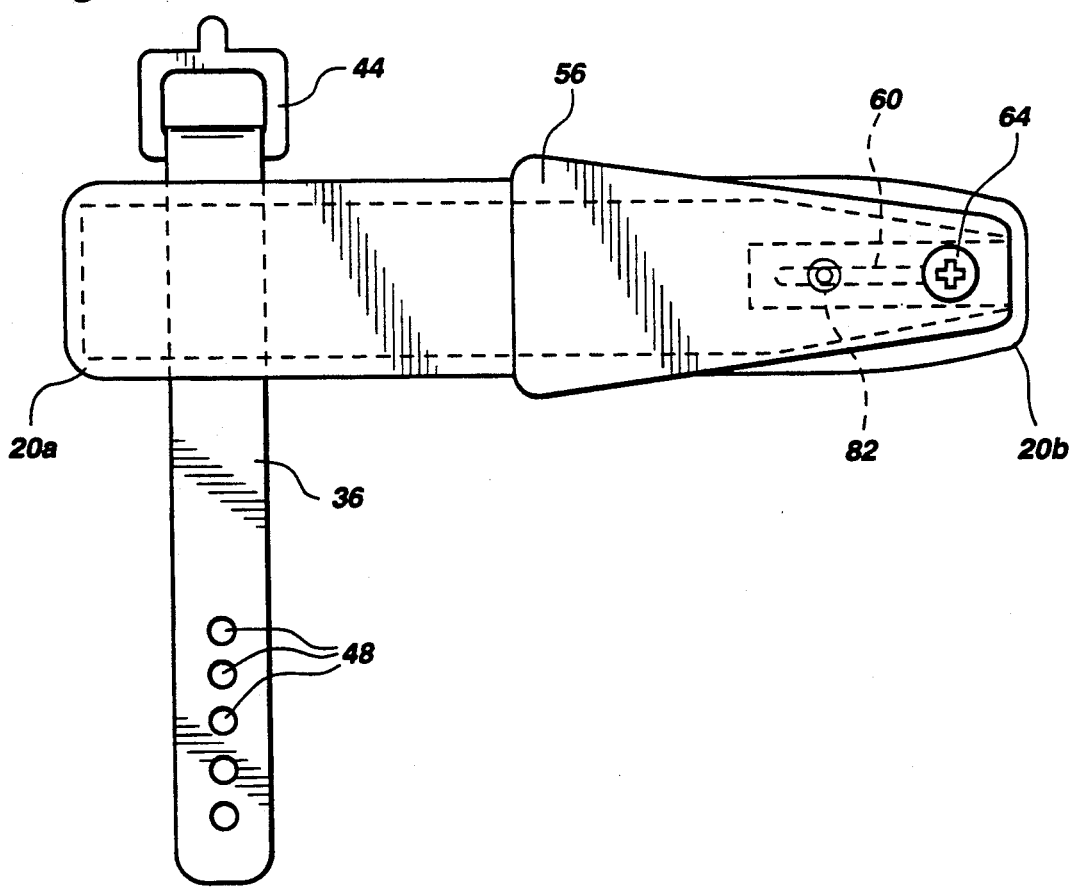
FIG. 5 is a top, plan view of the bicycle carrying accessory of FIG. 4.

Mounted on the top side of the forward end 20b of the pad 20 is a spacer block 52, on top of which is slidably mounted a wedge-shaped plate or insert 56. The insert 56 tapers transversely inwardly towards the forward end 20b of the pad 20 as best seen in FIGS. 2 and 5. A longitudinal slot 60 is formed in the insert 56 for receiving a machine screw 64. An opening 68 is formed in the spacer block 52 for at least partially receiving a threaded rivet insert 72 which is inserted upwardly through an opening in the stiffener strip 24 and into the opening 68. The rivet 72 has a threaded bore for allowing the screwing thereinto of the machine screw 64 to hold the insert 56 and spacer block 52 in place on the top side of the pad 20. In order to accommodate different styles and sizes of saddles, the machine screw 64 may be untightened to allow sliding the insert 56 forwardly or rearwardly as needed to properly fit within the hollow portion 4e of the saddle 4, as will be described momentarily. To further secure the spacer block 52 in place on the pad 20, a screw 78 may be inserted upwardly through an opening in the stiffener strip 24 and screwed into a threaded rivet 72 received in another opening 86 formed in a rearwardly spaced location from the opening 68, in the spacer block 52 (see FIGS. 3 and 4).

As alluded to earlier, the insert 56 is tapered to allow fitting the insert into the hollow portion 4e on the underside of the saddle 4 so that the side edges of the insert generally contact the downwardly projecting sides 4c of the saddle. The insert 56 is dimensioned to fit various sized bicycle seats on which the carrying accessory might be installed. For the seat style of FIGS. 1 and 2, the insert 56 would be inserted into the hollow portion 4e upwardly against the support rails 8. The sides 4c of the saddle 4 would be positioned on each side of the side edges of the insert 56 to prevent lateral movement thereof. The strap 36 would then be buckled snugly about the seat post 16 to secure the lower end 20a of the pad 20 in place. Urging the lower end 20a upwardly on the seat post 16 before buckling the strap 36 supplies a force to the forward end 20b of the pad 20 to urge the insert 56 snugly in position in the hollow portion 4e. If the strap 36 is then buckled, the carrying accessory of the present invention will be mounted securely on the bicycle seat.

The spacer block 52 might illustratively be made of a plastic material such as polyethylene. Similarly, the insert 56 may be made of a plastic material such as high density polyethylene. Of course, alternative materials could be used if the desired strength and sturdiness were present.

FIGS. 4 and 5 show the bicycle carrying accessory of the present invention laid out in a non-arcuate configuration. This is to illustrate that the pad 20 could illustratively be formed in a linear, uncurved profile but then, since the component parts of the pad are made of a flexible or resilient material, the pad could be manipulated and bent to the desired arcuate configuration when installed on a bicycle seat.

Figure 6:
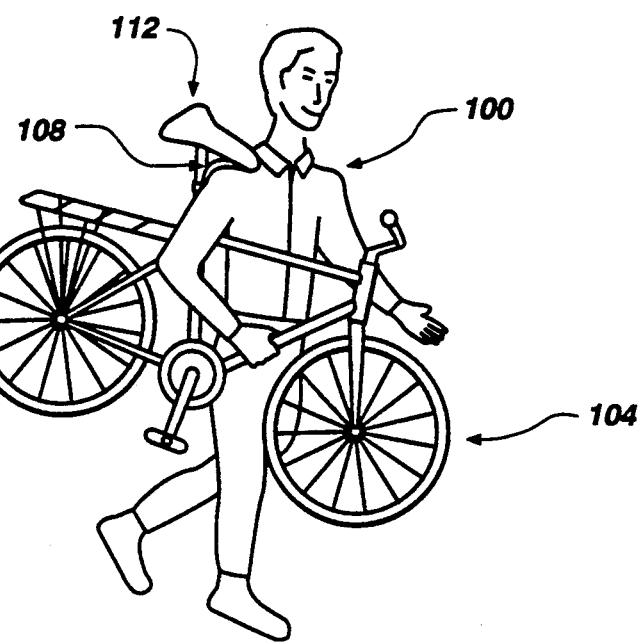
FIG. 6 is a perspective view of a bicycle, with seat-mounted carrying accessory of the present invention, shown being carried by a rider.

FIG. 6 is a perspective view of a bicycle rider 100 carrying a bicycle 104 on which has been installed a bicycle carrying accessory 108, just forwardly and underneath a bicycle seat 112 as previously described.

Figure 7:
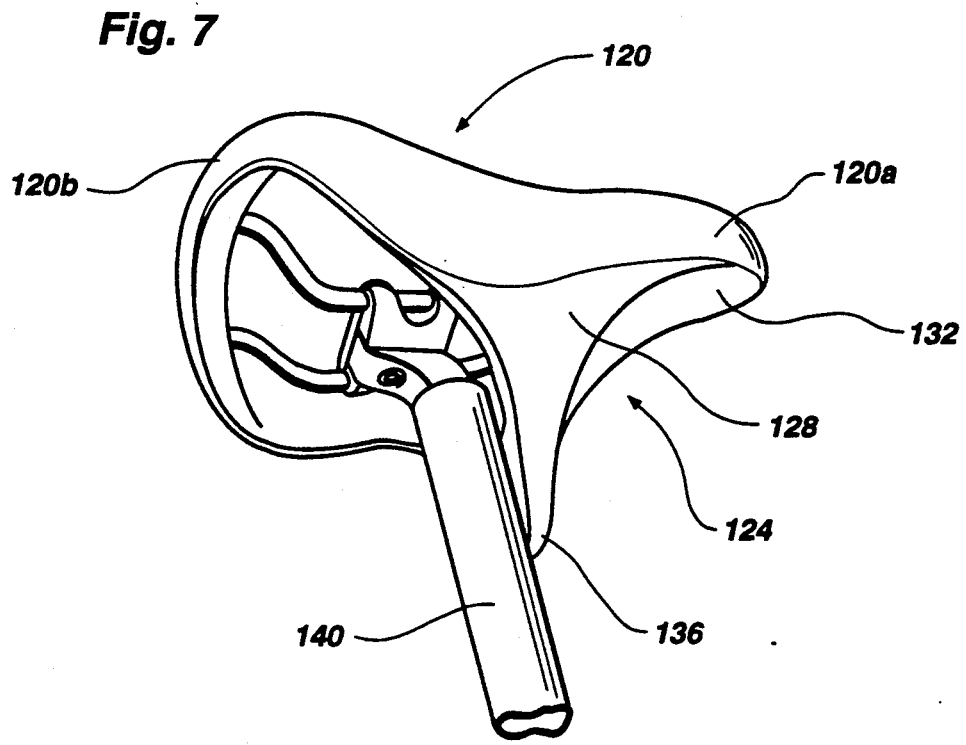
FIG. 7 is a side, bottom perspective view of an integrally-formed bicycle carrying accessory made in accordance with the principles of the present invention.

FIG. 7 shows another illustrative embodiment of a bicycle carrying accessory made in accordance with the principles of the present invention. In this embodiment, a saddle 120 is shown integrally formed with a carrying pad 124. The carrying pad includes side sections 128 which extend downwardly from the sides of a front section 120a of the saddle 120. A contact lower section 132 joins the lowermost extensions of the side sections 128 to present an arcuate surface which extends from just under the front of the saddle 120 rearwardly and downwardly to terminate in a lowermost extension 136. As can be seen from FIG. 1, the saddle 120 is formed integrally with the carrying pad 124 preferably of a fairly sturdy but yet soft material such as polyurethane foam, disposed over a molded nylon shell and covered with lycra. As also seen in FIG. 7, the lowermost extension 136 of the carrying pad 124 is not attached to the seat post 140. The rest of the structure on which the saddle 120 is mounted is the same as that shown and described in FIG. 1.

Although the carrying accessory of the present invention is shown as being mounted or formed forwardly of the seat post and underneath the seat, it should be understood that the accessory could also be mounted underneath the rear portion of the seat to extend downwardly and forwardly from the rearmost edge of the saddle to a point just behind the seat post. Attaching the pad in such a position could be done in any conventional fashion including using a strap to attach the forward lowermost part of the pad to the seat post and the rearward uppermost part of the pad to support rails or directly to the saddle at the rear of the seat. Also, such a rearward underneath disposition of the accessory could be with the carrying pad formed integrally with the saddle as described for FIG. 7.

With the bicycle carrying accessory of the present invention, a bicycle may be readily lifted or hoisted to position the pad over a person's shoulder to allow carrying the bicycle as needed. With the accessory mounted under the seat, the bicycle need not be lifted as high to fit it over the shoulder, as is required with prior art pads mounted in the bicycle frame. Also, the balance point being just under the seat allows for more stable portage of a bicycle since the center of gravity of the bicycle is well below the balancing point. Further, there is no space conflict between the carrying accessory and water bottle or pump mounts as with prior art carrying pads. Some bicycle frame designs currently being used either have small frame triangles or in some cases no triangles at all, and the carrying accessory of the present invention may be installed on such bicycles so as not to interfere with the structural limitations of such designs. Finally, a bicycle on which the carrying accessory is installed may be easily transferred from one shoulder to the other shoulder to avoid fatigue from carrying it on one shoulder only.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A carrying accessory for bicycles which have a frame, a saddle post extending upwardly from the frame, and a saddle mounted on top of the post, said accessory including
    an arcuate, flexible pad having a lower end and a forward end, for attaching to a bicycle so that the pad, with the lower end adjacent the post, extends upwardly and forwardly, with the forward end adjacent and under the front end of the saddle,
    first means for attaching the lower end of the pad to the front side of the post, and
    second means for attaching the forward end of the pad to the underside of the front end of the saddle.

2. A carrying accessory as in claim 1 wherein said pad comprises
    an arcuate stiffener, and
    padding affixed to the forward side of the stiffener to cover the forward side and provide a cushion for a human body part on which the pad may be placed for carrying the bicycle.

3. A carrying accessory as in claim 2 wherein the stiffener is made of a resilient material.

4. A carrying accessory as in claim 3 wherein the resilient material is of polyethylene.

5. A carrying accessory as in claim 2 wherein said padding comprises
    a layer of compressible, resilient material attached to the forward side of the stiffener, and
    a flexible cover disposed over the layer of material.

6. A carrying accessory as in claim 5 wherein said layer of material is comprised of a closed-cell foam elastic material.

7. A carrying accessory as in claim 6 wherein said elastic material comprises neoprene rubber.

8. A carrying accessory as in claim 6 wherein said cover is made of lycra.

9. A carrying accessory as in claim 1 wherein said first means comprises a strap, attached to the pad to extend laterally therefrom, said strap having two free ends, and a buckle attached to one end of the strap for coupling to the other end when the strap is wrapped about the post.

10. A carrying accessory as in claim 9 wherein said strap is made of a non-skid material.

11. A carrying accessory as in claim 10 wherein said non-skid material is urethane rubber.

12. A carrying accessory as in claim 1 wherein said saddle is formed with a wider rear portion which narrows to a wedge-shaped front portion, having a wedge-shaped hollow underside portion, and wherein said second means comprises a wedge-shaped plate attached to the top side of the forward end of the pad for fitting securely into the hollow front portion of the saddle.

13. A carrying accessory as in claim 12 wherein said second means further comprises a spacer block disposed between the plate and the pad, and means for attaching the plate to the spacer block to allow selectively moving the plate forwardly or rearwardly relative to the block.

14. A carrying accessory as in claim 13 wherein said plate-to-spacer attachment means comprises a slot formed in the plate to extend longitudinally thereof, a bore formed in the spacer block, a threaded bore formed in the pad, and a screw inserted through the slot and bore for screwing into the threaded bore in the pad so that the screw may be unscrewed to allow sliding the plate forwardly or rearwardly about the screw, and screwed in to secure the plate against the spacer block and the spacer block against the pad, all in fixed positions.

15. In combination with a bicycle having a frame, a seat post extending upwardly from the frame, and a seat mounted on top of the post, a bicycle portage accessory comprising a resilient pad disposed at the underside of the seat to contact a human body part over which the seat is placed and to cushion the body part from the underside of the seat, and means for detachably affixing the pad to the underside of the seat,
    wherein said seat includes a forward section projecting forwardly of the seat post, with an underneath tapered hollow portion, wherein said pad is elongate, with a lower end and a forward end, and wherein said affixing means comprises
    first means for detachably affixing the lower end of the pad to the post, and
    second means for detachably affixing the forward end of the pad to the underside of the forward section of the seat.

16. A bicycle portage accessory as in claim 15 wherein said pad comprises
    an elongate, resilient stiffener element, and
    padding disposed about the stiffener element.

17. A bicycle portage accessory as in claim 15 wherein said first means comprises a strap and buckle attached to the pad near the lower end thereof for wrapping about the post to hold the lower end of the pad thereagainst.

18. A bicycle portage accessory as in claim 15 wherein said second means comprises a wedge-shape insert mounted on top of the forward end of the pad, and dimensioned to fit securely within the tapered hollow portion of the seat and thereby hold the forward end of the pad against the seat.

19. A bicycle portage accessory as in claim 18 wherein said second means further comprises means for mounting the insert on the pad to allow moving and affixing the insert forwardly and rearwardly of the pad.

* * * * *